United States Patent
Fischer et al.

(10) Patent No.: US 10,875,139 B2
(45) Date of Patent: Dec. 29, 2020

(54) MACHINE TOOL COMPRISING A HARDNESS TESTING DEVICE

(71) Applicant: MAN DIESEL & TURBO SE, Augsburg (DE)

(72) Inventors: Jochen Fischer, Zusmarshausen (DE); Martin Bröll, Langenneufnach (DE)

(73) Assignee: MAN Energy Solutions SE, Augsburg (DE)

( * ) Notice: Subject to any disclaimer, the term of this patent is extended or adjusted under 35 U.S.C. 154(b) by 276 days.

(21) Appl. No.: 15/023,993

(22) PCT Filed: Sep. 4, 2014

(86) PCT No.: PCT/EP2014/068787
§ 371 (c)(1),
(2) Date: Mar. 22, 2016

(87) PCT Pub. No.: WO2015/039875
PCT Pub. Date: Mar. 26, 2015

(65) Prior Publication Data
US 2016/0236312 A1   Aug. 18, 2016

(30) Foreign Application Priority Data

Sep. 23, 2013 (DE) .................. 10 2013 015 685

(51) Int. Cl.
*B23Q 17/20* (2006.01)
*B23Q 3/155* (2006.01)
(Continued)

(52) U.S. Cl.
CPC ............. *B23Q 17/20* (2013.01); *B23Q 3/157* (2013.01); *B23Q 3/1556* (2013.01); *G01N 3/405* (2013.01);
(Continued)

(58) Field of Classification Search
CPC ........ Y10T 409/303864; Y10T 408/05; B23Q 3/155–3/15793; B23Q 17/20;
(Continued)

(56) References Cited

U.S. PATENT DOCUMENTS 2,126,175 A * 8/1938 Dalcher ............ G01N 3/58
409/133
2,259,840 A * 10/1941 Smith ............. G01N 3/42
73/81
(Continued)

FOREIGN PATENT DOCUMENTS

CN   201261146   6/2009
CN   202305355   7/2012
(Continued)

OTHER PUBLICATIONS

Machine Translation of JP 2005-193318, which JP '318 was published Jul. 21, 2005.*
(Continued)

*Primary Examiner* — Erica E Cadugan
(74) *Attorney, Agent, or Firm* — Cozen O'Connor

(57) ABSTRACT

Machine tool with a workpiece receptacle for receiving a workpiece to be machined and with a tool receptacle for receiving a tool that is needed for machining a workpiece. A hardness measuring device is integrated in the machine tool, and a hardness measurement can be carried out in an automated manner at the workpiece by the hardness measuring device.

9 Claims, 1 Drawing Sheet

(51) Int. Cl.
  *B23Q 3/157* (2006.01)
  *G01N 3/40* (2006.01)
  *G01N 3/42* (2006.01)

(52) U.S. Cl.
  CPC ....... *G01N 3/42* (2013.01); *Y10T 409/303864* (2015.01); *Y10T 483/17* (2015.01)

(58) Field of Classification Search
  CPC ........ B23Q 2220/008; B23Q 2230/002; B23Q 17/0966; B23Q 17/09–17/0995; G01N 3/40–3/54; G01N 3/405
  USPC .............................. 409/133; 408/2; 73/78–85
  See application file for complete search history.

(56) References Cited

U.S. PATENT DOCUMENTS

| | | | |
|---|---|---|---|
| 4,040,291 A | | 8/1977 | Ince |
| 4,107,978 A | | 8/1978 | Ernst |
| 4,635,471 A | * | 1/1987 | Rogers .................... G01N 3/42 409/133 |
| 5,092,175 A | | 3/1992 | Winckler et al. |
| 5,195,364 A | | 3/1993 | Dehe et al. |
| 9,778,082 B2 | | 10/2017 | Bear et al. |
| 9,919,471 B2 | | 3/2018 | Raszillier et al. |
| 10,195,958 B2 | | 2/2019 | Meitinger |
| 2005/0016264 A1 | | 1/2005 | Anthe et al. |

FOREIGN PATENT DOCUMENTS

| | | | |
|---|---|---|---|
| CN | 202861446 | | 4/2013 |
| DE | 3934578 A1 | * | 4/1991 |
| DE | 4011313 A1 | * | 10/1991 |
| DE | 10163656 | | 7/2003 |
| DE | 10 2011 011685 | | 8/2012 |
| EP | 0 461 740 | | 12/1991 |
| EP | 1 783 479 | | 5/2007 |
| EP | 2 009 388 | | 12/2008 |
| FR | 2 343 240 | | 9/1977 |
| JP | H02-504186 | | 11/1990 |
| JP | H11-58184 | | 3/1999 |
| JP | 2005-193318 | | 7/2005 |
| JP | 2008-105163 | | 5/2008 |
| WO | WO 88/10416 | | 12/1988 |

OTHER PUBLICATIONS

Machine Translation of JP 2008-105163, which JP '163 was published May 8, 2008.*
Machine Translation of JP 11-058184, which JP '184 was published Mar. 2, 1999.*
Machine Translation of DE 3934578 A1, which DE '578 was published Apr. 1991.*
Machine Translation of DE 4011313 A1, which DE '313 was published Oct. 1991.*
Chapter 2 of Fluid Mechanics and Machinery, Second Edition by Chanamala Ratnam & Arun Vikram Kothapalli, published in 2011.

* cited by examiner

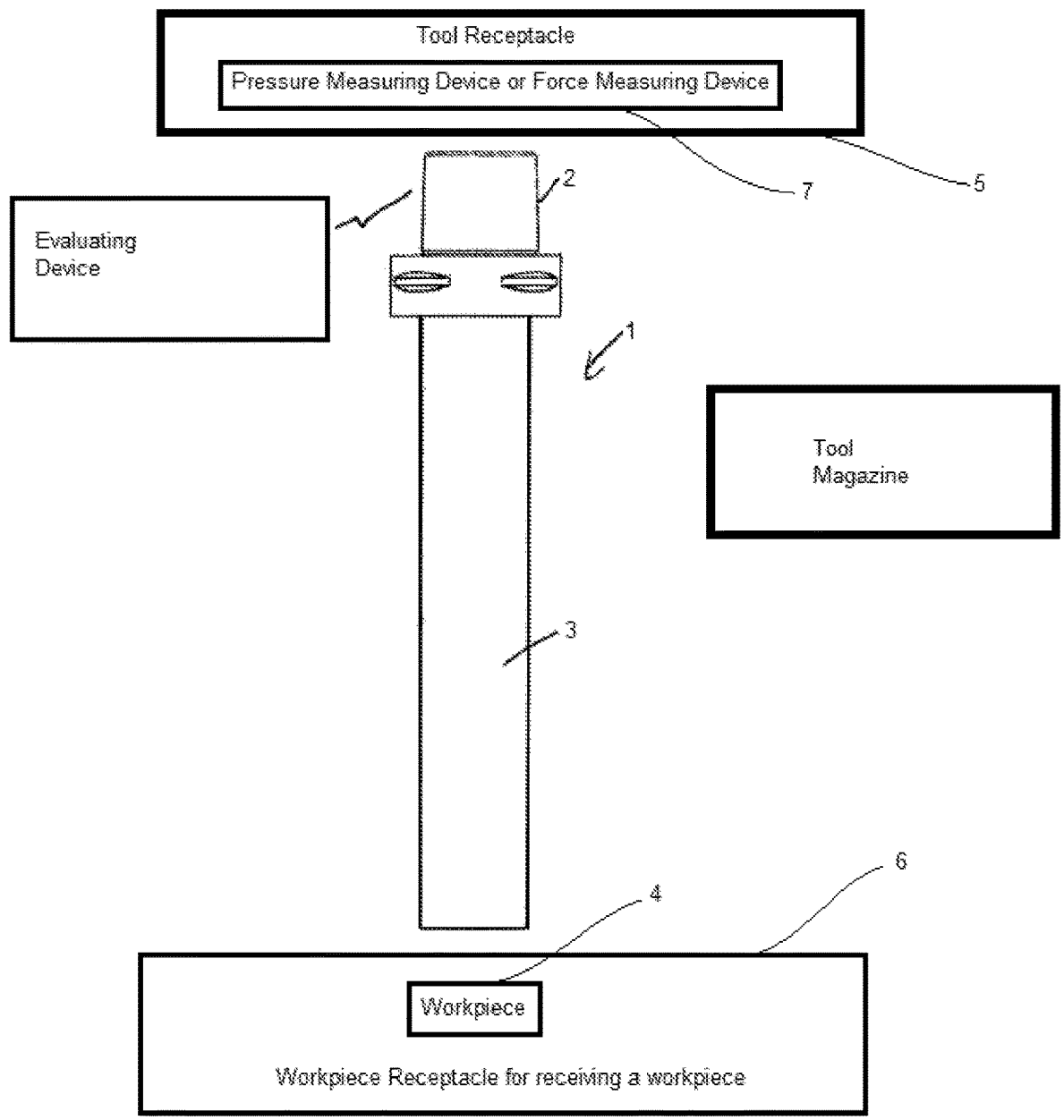

MACHINE TOOL COMPRISING A HARDNESS TESTING DEVICE

PRIORITY CLAIM

This is a U.S. national stage of application No. PCT/EP2014/068787, filed on Sep. 4, 2014. Priority is claimed on German Application No.: DE102013015685.8 filed Sep. 23, 2013, the content of which is incorporated here by reference.

BACKGROUND OF THE INVENTION

1. Field of the Invention

The invention is directed to a machine tool with an integrated hardness testing device.

2. Description of the Prior Art

The basic construction of a machine tool is well known from practice. A machine tool has a workpiece receptacle for receiving a workpiece to be machined on the machine tool. A machine tool further comprises a tool receptacle for receiving a tool that is needed for machining the workpiece. Tools for the machine tool are typically kept in a tool magazine. To carry out a tool change automatically, the tool receptacle automatically takes a tool out of the tool magazine and, in return, can position a tool that is no longer needed in the tool magazine.

It is further already known from practice to remove the workpiece from the machine tool after the workpiece has been machined on the machine tool and to subject this workpiece to a workpiece examination. In this way, a hardness measurement can be taken at the workpiece.

Hardness measuring devices that work on the UCI (Ultrasonic Contact Impedance) principle are already known from practice. In the UCI method, a UCI hardness measuring device is fitted manually to the workpiece and pressed against the workpiece by manual force. When a nominal test force is reached, the test indentation is measured electronically by the Vickers diamond and the hardness measurement can be immediately displayed.

This UCI method is mentioned here only as an example of a hardness measurement; other methods are also conceivable.

Heretofore, hardness measurement has been carried out separately from the machining process, manually in the UCI method, or on other automated testing devices. This demands a greater expenditure of time and associated costs and, in the manual process, limits reproducibility. Accordingly, the UCI hardness measuring device is fitted to the workpiece manually by a worker and is pressed by manual force against the workpiece.

SUMMARY OF THE INVENTION

One aspect of the present invention provides a novel machine tool, in particular a functional expansion of the machine tool, such that an automated hardness test is possible during the machining process.

According to one aspect of the invention, a hardness measuring device is integrated in the machine tool and a hardness measurement can be carried out in an automated manner at the workpiece by the hardness measuring device.

According to one aspect of the present invention, a hardness measuring device, particularly a UCI hardness measuring device, is integrated in a machine tool. A hardness measurement can then be carried out automatically without manual intervention on the part of a worker. In this way, the entire hardness measurement can be reproducible, automated, and process-integrated.

The hardness measuring device is a UCI hardness measuring device which can be fitted to the workpiece automatically by a tool receptacle and can be pressed against the workpiece automatically with a defined force. The hardness measuring device can be fitted to the workpiece automatically at a defined angle by the tool receptacle in a tool spindle or in a tool turret and pressed against the workpiece automatically with a defined force. Accordingly, the entire hardness measurement is reproducible, automated, and process-integrated.

There is preferably integrated in the tool receptacle or, on the machine side, in the chucking device for the tool receptacle, a pressure measuring device or a force measuring device by which the force with which the hardness measuring device is pressed against the workpiece can be measured automatically. A force measurement obtained in this way can be transmitted automatically to an evaluating device. The evaluating device controls the tool axes such that the force measurement corresponds to a target force value. The quality of the hardness measurement can be further improved by controlling the force with which the hardness measuring device presses against the workpiece.

BRIEF DESCRIPTION OF THE DRAWINGS

Preferred further developments of the invention follow from the dependent claims and the following description. Without limiting generality, an embodiment example of the invention will be described more fully with reference to the drawing. The drawing shows:

The FIGURE is a UCI hardness measuring device for use, in a machine tool.

DETAILED DESCRIPTION OF THE PRESENTLY PREFERRED EMBODIMENTS

The present invention is directed to measuring device for a machine tool. The basic construction of a hardness measuring device and machine tool will be familiar to the person skilled in the art.

The machine tool has a workpiece receptacle for receiving a workpiece to be machined. The workpiece receptacle can be a clamping chuck in which the workpiece to be machined can be firmly clamped.

A machine tool preferably further comprises a tool magazine in which different tools of the machine tool are kept.

A machine tool further comprises a tool receptacle for receiving a tool that is needed for machining the workpiece. For automatic exchange of tools, the tool receptacle can remove a new tool that is needed for machining the workpiece from the tool magazine and, in return, can position a tool that is no longer needed in the tool magazine.

Typically, the tool receptacle and, therefore, the tool received in the tool receptacle is displaceable relative to the workpiece by a tool spindle.

With the present invention, it is suggested that a hardness measuring device by which a hardness measurement can be carried out automatically at the workpiece is integrated in the machine tool. The hardness measuring device integrated in the machine tool is preferably a UCI hardness measuring device that measures hardness at the workpiece by the UCI (Ultrasonic Contact Impedance) method.

The hardness measuring device can preferably be fitted to the workpiece automatically at a defined angle by the machine tool and can be pressed automatically against the workpiece with a defined force. In this connection, it can be provided that the hardness measuring device is placed in a tool magazine together with the tools of the machine tool. For purposes of an automatic tool change, the tool receptacle can then automatically remove the hardness measuring device from the tool magazine to carry out a hardness measurement and, in return, can position a tool that is no longer needed for hardness measurement in the tool magazine.

A hardness measurement value obtained during the automatic hardness measurement can be transmitted automatically from the hardness measuring device to an evaluating device, namely, for storing and/or evaluating the hardness measurement value. The hardness measuring device integrated in the machine tool preferably transmits the hardness measurement value wirelessly to the evaluating device.

Of course, it is also conceivable and possible, for example, to store and subsequently transmit measurements in the measuring head, i.e., in the probe. The important thing is that the values are transmitted inside the machine tool.

As has already been stated, the hardness measuring device can be pressed against the workpiece automatically with a defined force by the tool receptacle. In this respect, it can be provided that a pressure measuring device or a force measuring device by which the force with which the hardness measuring device is pressed against the workpiece can be measured automatically is further integrated in the tool receptacle. In this respect, it is then preferably provided that a force measurement value obtained in this manner is automatically transmitted to the evaluating device which then controls the tool receptacle such that the force measurement value corresponds to a target force value and accordingly presses the hardness measuring device against the workpiece with a defined force.

As has already been stated, a tool spindle serves to displace the tool receptacle relative to the workpiece. Accordingly, the hardness measuring device received in the tool receptacle together with the tool receptacle can be displaced relative to the workpiece via the tool spindle and fitted to the workpiece at a defined angle. In other words, the hardness measuring device can be moved relative to the workpiece in defined axes depending on the machine tool.

The process reliability of the hardness measurement can be enhanced in that the hardness measuring device is integrated in the machine tool. Further, the entire hardness measurement can be reproduced because errors due to manual operation can be prevented. Moreover, a hardness measurement can be carried out in a shorter time and between the machining steps.

FIG. 1 shows in a highly schematic diagram a UCI hardness measuring device 1 integrated in the machine tool. A measuring head 3 of the hardness measuring device 1 can be pressed against the workpiece 4 at a defined angle and with a defined force.

A portion 2 of the hardness measuring device 1 opposite the measuring head 3 serves to receive and hold the hardness measuring device 1 in a tool receptacle 5 of the machine tool. A workpiece receptacle 6 holds the workpiece 4. The measuring device or a force measuring device 7.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A machine tool comprising:
   a workpiece receptacle for receiving a workpiece to be machined;
   a tool spindle having a tool receptacle therein;
   one or more tools for machining the workpiece, wherein the tool receptacle is configured to receive the one or more tools for machining the workpiece; and
   an ultrasonic contact impedance hardness measuring device;
   wherein the ultrasonic contact impedance hardness measuring device is configured to be automatically received in the tool receptacle, and
   a hardness measurement of the workpiece via the ultrasonic contact impedance hardness measuring device can be carried out in an automated manner;
   the machine tool further comprising one of a pressure measurer and a force measurer integrated in the tool receptacle, the one of the pressure measurer and the force measurer configured to automatically measure a force with which the ultrasonic contact impedance hardness measuring device is pressed against the workpiece.

2. The machine tool according to claim 1, wherein the ultrasonic contact impedance hardness measuring device is configured to be fitted to the workpiece automatically by the tool receptacle and can be pressed against the workpiece automatically with a defined force.

3. The machine tool according to claim 2, wherein a hardness measurement value obtained by the ultrasonic contact impedance hardness measuring device is transmitted automatically to an evaluator for storage and/or evaluation.

4. The machine tool according to claim 1, wherein a hardness measurement value obtained by the ultrasonic contact impedance hardness measuring device is transmitted automatically to an evaluator for storage and/or evaluation.

5. The machine tool according to claim 4, wherein the ultrasonic contact impedance hardness measuring device transmits the hardness measurement value wirelessly to the evaluator.

6. The machine tool according to claim 1, wherein a force measurement is automatically transmitted to an evaluator, wherein the evaluator controls the tool receptacle such that the force measurement corresponds to a target force value.

7. The machine tool according to claim 1, further comprising:
   a tool magazine configured to receive at least the ultrasonic contact impedance hardness measuring device,
   wherein, for an automatic tool change, the ultrasonic contact impedance hardness measuring device is configured to be automatically removed from the tool magazine and received by the tool receptacle and, conversely, can be automatically removed from the tool receptacle and received in the tool magazine.

8. The machine tool according to claim 7, wherein the ultrasonic contact impedance hardness measuring device, together with the tool receptacle receiving the ultrasonic contact impedance hardness measuring device, is automatically displaceable relative to the workpiece along an axis and can be fitted to the workpiece at a reproducible angle with respect to a surface of the workpiece.

9. The machine tool according to claim 1, wherein the ultrasonic contact impedance hardness measuring device, together with the tool receptacle receiving the ultrasonic contact impedance hardness measuring device, is automatically displaceable relative to the workpiece along an axis and can be fitted to the workpiece at a reproducible angle with respect to a surface of the workpiece.

\* \* \* \* \*